US012628055B2

(12) United States Patent
Wang et al.

(10) Patent No.: US 12,628,055 B2
(45) Date of Patent: May 12, 2026

(54) METHOD, DEVICE AND COMPUTER STORAGE MEDIUM OF COMMUNICATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 354 days.

(21) Appl. No.: 18/035,792

(22) PCT Filed: Nov. 20, 2020

(86) PCT No.: PCT/CN2020/130518
§ 371 (c)(1),
(2) Date: May 8, 2023

(87) PCT Pub. No.: WO2022/104715
PCT Pub. Date: May 27, 2022

(65) Prior Publication Data
US 2024/0015616 A1     Jan. 11, 2024

(51) Int. Cl.
*H04W 76/30* (2018.01)
*H04W 36/00* (2009.01)
H04L 5/00 (2006.01)

(52) U.S. Cl.
CPC ..... *H04W 36/00837* (2018.08); *H04W 76/30* (2018.02); *H04L 5/0007* (2013.01); *H04W 36/00692* (2023.05)

(58) Field of Classification Search
CPC ........................ H04W 36/00837; H04W 76/30
(Continued)

(56) References Cited

U.S. PATENT DOCUMENTS

2015/0237533 A1     8/2015  Keskitalo et al.
2017/0289894 A1*   10/2017  Palm .................... H04W 76/14
(Continued)

FOREIGN PATENT DOCUMENTS

CN          109479220 A       3/2019
CN          111713138 A       9/2020
(Continued)

OTHER PUBLICATIONS

Written Opinion for PCT/CN2020/130518, dated Aug. 18, 2021.
International Search Report for PCT/CN2020/130518, dated Aug. 18, 2021.
EP Communication dated Dec. 8, 2023 in App. No 20962006.1.
(Continued)

*Primary Examiner* — Qutbuddin Ghulamali
(74) *Attorney, Agent, or Firm* — Sughrue Mion, PLLC

(57) ABSTRACT

Embodiments of the present disclosure relate to methods, devices and computer readable media for communication. A method of communication comprises generating, at a terminal device, information of a scheduling gap of the first network device, the first network device being associated with a first subscriber identity module of the terminal device and the second network device being associated with a second subscriber identity module of the terminal device; and transmitting the information of the scheduling gap to the first network device for requesting a switch from the first network device to a second network device without releasing a radio resource control connection with the first network device. Thereby, only traffic on a part of serving cells of the first network device is interrupted.

4 Claims, 6 Drawing Sheets

DETERMINE, AT A TERMINAL DEVICE, INFORMATION OF A POINT REGARDING A SWITCH OF THE TERMINAL DEVICE FROM A FIRST NETWORK DEVICE TO A SECOND NETWORK DEVICE

TRANSMIT, TO THE FIRST NETWORK DEVICE, THE INFORMATION OF THE POINT OF TIME IN A MESSAGE FOR REQUESTING A RELEASE OF A CONNECTION WITH THE FIRST NETWORK DEVICE

(58) Field of Classification Search
    USPC ......................................................... 455/436
    See application file for complete search history.

(56)                    References Cited

U.S. PATENT DOCUMENTS

| 2019/0028938 | A1   | 1/2019  | Park et al.           |
| 2019/0098489 | A1   | 3/2019  | Shi et al.            |
| 2019/0104452 | A1\* | 4/2019  | Park .......... H04W 36/185 |
| 2019/0320495 | A1   | 10/2019 | Kuang et al.          |
| 2019/0327659 | A1\* | 10/2019 | Horn .......... H04W 76/15 |
| 2020/0022042 | A1   | 1/2020  | Yin                   |
| 2020/0145888 | A1   | 5/2020  | Paladugu et al.       |
| 2023/0262446 | A1\* | 8/2023  | Kim .......... H04W 8/20 |
|              |      |         |              455/422.1 |

FOREIGN PATENT DOCUMENTS

| EP | 3 503 620      A1 | 6/2019 |
| KR | 10-2020-0045952 A | 5/2020 |

OTHER PUBLICATIONS

Extended European Search Report issued Feb. 29, 2024 in European Application No. 20962006.1.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.3.0, Sep. 2020, pp. 1-390 (390 pages total).

Huawei, et al., "Overview of Rel-17 work areas for NR and LTE". 3GPP TSG RAN Meeting #84, RP-191486, Newport Beach, USA, Jun. 3-6, 2019 (22 pages total).

Huawei, et al., "CR on measurement gap patterns in TS 36.133", 3GPP TSG-RAN WG4 Meeting #86, R4-1802618, Athens, Greece, Feb. 26-Mar. 3, 2018 (6 pages total).

Communication dated Oct. 1, 2024 from the Japanese Patent Office in Application No. 2023-530537.

Huawei et al.,"Solution for KI#1: Short two-RRC-connections", 3GPP TSG SA WG2 #136 S2-1911690, 2019, pp. 1-7 (8 pages total) https://www.3gpp.org/ftp/tsg_sa/WG2_Arch/TSGS2_136_Reno/Docs/S2-1911690.zip.

\* cited by examiner

100A

100B

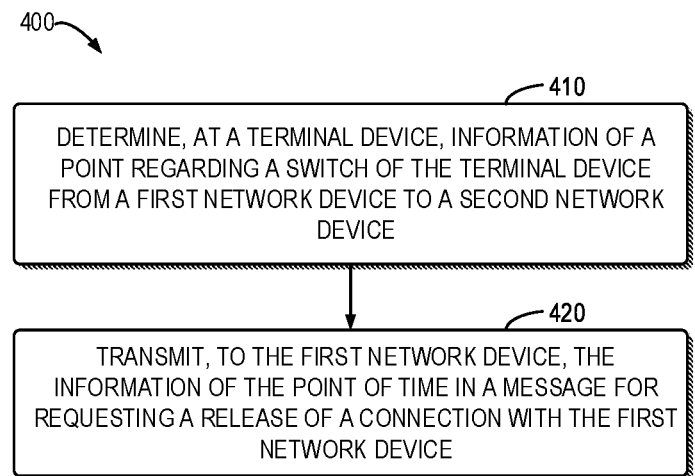

400

410

DETERMINE, AT A TERMINAL DEVICE, INFORMATION OF A POINT REGARDING A SWITCH OF THE TERMINAL DEVICE FROM A FIRST NETWORK DEVICE TO A SECOND NETWORK DEVICE

420

TRANSMIT, TO THE FIRST NETWORK DEVICE, THE INFORMATION OF THE POINT OF TIME IN A MESSAGE FOR REQUESTING A RELEASE OF A CONNECTION WITH THE FIRST NETWORK DEVICE

FIG. 4

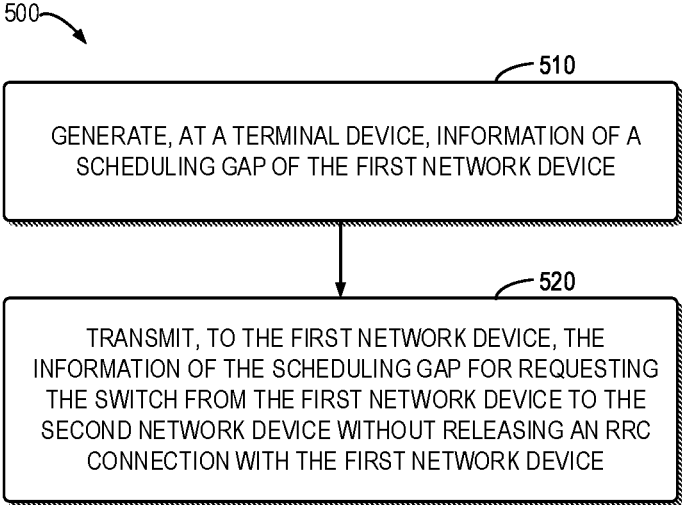

500

510

GENERATE, AT A TERMINAL DEVICE, INFORMATION OF A SCHEDULING GAP OF THE FIRST NETWORK DEVICE

520

TRANSMIT, TO THE FIRST NETWORK DEVICE, THE INFORMATION OF THE SCHEDULING GAP FOR REQUESTING THE SWITCH FROM THE FIRST NETWORK DEVICE TO THE SECOND NETWORK DEVICE WITHOUT RELEASING AN RRC CONNECTION WITH THE FIRST NETWORK DEVICE

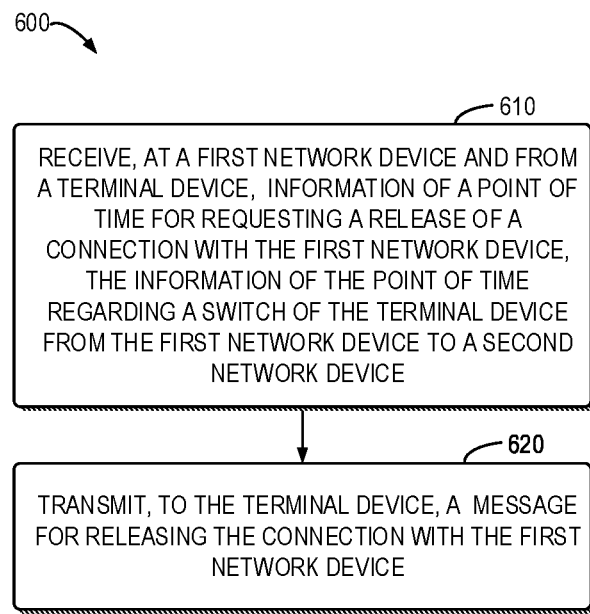

610

RECEIVE, AT A FIRST NETWORK DEVICE AND FROM A TERMINAL DEVICE, INFORMATION OF A POINT OF TIME FOR REQUESTING A RELEASE OF A CONNECTION WITH THE FIRST NETWORK DEVICE, THE INFORMATION OF THE POINT OF TIME REGARDING A SWITCH OF THE TERMINAL DEVICE FROM THE FIRST NETWORK DEVICE TO A SECOND NETWORK DEVICE

620

TRANSMIT, TO THE TERMINAL DEVICE, A MESSAGE FOR RELEASING THE CONNECTION WITH THE FIRST NETWORK DEVICE

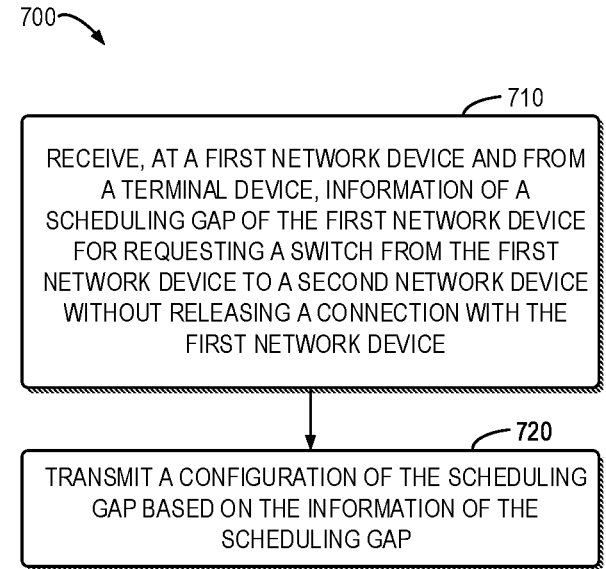

710

RECEIVE, AT A FIRST NETWORK DEVICE AND FROM A TERMINAL DEVICE, INFORMATION OF A SCHEDULING GAP OF THE FIRST NETWORK DEVICE FOR REQUESTING A SWITCH FROM THE FIRST NETWORK DEVICE TO A SECOND NETWORK DEVICE WITHOUT RELEASING A CONNECTION WITH THE FIRST NETWORK DEVICE

720

TRANSMIT A CONFIGURATION OF THE SCHEDULING GAP BASED ON THE INFORMATION OF THE SCHEDULING GAP

FIG. 7

METHOD, DEVICE AND COMPUTER STORAGE MEDIUM OF COMMUNICATION

CROSS REFERENCE TO RELATED APPLICATIONS

This application is a National Stage of International Application No. PCT/CN2020/130518 filed Nov. 20, 2020.

TECHNICAL FIELD

Embodiments of the present disclosure generally relate to the field of telecommunication, and in particular, to methods, devices and computer storage media of communication during a switch among networks of multi-universal subscriber identity module (USIM).

BACKGROUND

Currently, a multi-USIM terminal device occupies a large market share. Two USIM cards may conform to same or different communication standards such as long term evolution (LTE), new radio (NR) or the like, and the radio frequency (RF) capability of the terminal device may be 1 transmit port (Tx)/1 receive port (Rx), 1Tx/2Rx, 2Tx/1Rx or the like.

In some scenarios, a multi-USIM terminal device may establish a connection in a network A of USIM A and stay in an idle or inactive state in a network B of USIM B. Conventionally, when the terminal device needs to operate in the network B, such as perform data transmission or monitor paging occasion, the terminal device just releases the connection with the network A and switches to the network B without noticing the network A. This will bring a bad impact to performance of the network A.

SUMMARY

In general, embodiments of the present disclosure provide methods, devices and computer storage media for communication during a switch among networks of multi-USIM.

In a first aspect, there is provided a method of communication. The method comprises: determining, at a terminal device, information of a point of time regarding a switch from a first network device to a second network device, the first network device being associated with a first subscriber identity module of the terminal device and the second network device being associated with a second subscriber identity module of the terminal device; and transmitting the information of the point of time to the first network device for requesting a release of a connection with the first network device.

In a second aspect, there is provided a method of communication. The method comprises: generating, at a terminal device, information related to an expected scheduling gap of a first network device; and transmitting the information related to the expected scheduling gap to the first network device for requesting a switch from the first network device to a second network device without releasing a radio resource control connection with the first network device, the first network device being associated with a first subscriber identity module of the terminal device and the second network device being associated with a second subscriber identity module of the terminal device.

In a third aspect, there is provided a method of communication. The method comprises: receiving, at a first network device and from a terminal device, information of a point of time for requesting a release of a connection with the first network device, the information of the point of time regarding a switch from the first network device to a second network device, the first network device being associated with a first subscriber identity module of the terminal device and the second network device being associated with a second subscriber identity module of the terminal device; and transmitting, to the terminal device, a message for releasing the connection with the first network device.

In a fourth aspect, there is provided a method of communication. The method comprises: receiving, at a first network device and from a terminal device, information related to an expected scheduling gap of the first network device for requesting a switch from the first network device to a second network device without releasing a connection with the first network device, the first network device being associated with a first subscriber identity module of the terminal device and the second network device being associated with a second subscriber identity module of the terminal device; and transmitting, to the terminal device, a configuration of the scheduling gap based on the information related to the expected scheduling gap.

In a fifth aspect, there is provided a terminal device. The terminal device comprises a processor and a memory coupled to the processor. The memory stores instructions that when executed by the processor, cause the terminal device to perform the method according to the first and second aspects of the present disclosure.

In a sixth aspect, there is provided a network device. The network device comprises a processor and a memory coupled to the processor. The memory stores instructions that when executed by the processor, cause the network device to perform the method according to the third and fourth aspects of the present disclosure.

In a seventh aspect, there is provided a computer readable medium having instructions stored thereon. The instructions, when executed on at least one processor, cause the at least one processor to perform the method according to the first and second aspects of the present disclosure.

In an eighth aspect, there is provided a computer readable medium having instructions stored thereon. The instructions, when executed on at least one processor, cause the at least one processor to perform the method according to the third and fourth aspects of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 4 illustrates an example method of communication implemented at a terminal device in accordance with some embodiments of the present disclosure;

FIG. 5 illustrates another example method of communication implemented at a terminal device in accordance with some embodiments of the present disclosure;

FIG. 6 illustrates an example method of communication implemented at a network device in accordance with some embodiments of the present disclosure;

FIG. 7 illustrates another example method of communication implemented at a network device in accordance with some embodiments of the present disclosure.

Throughout the drawings, the same or similar reference numerals represent the same or similar element.

DETAILED DESCRIPTION

Figure 1A:
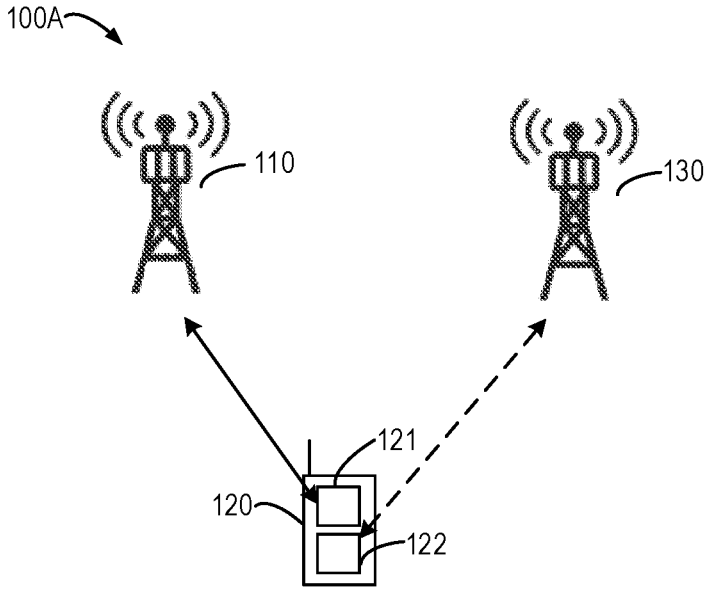
FIG. 1A illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As used herein, the term "subscriber identity module (SIM)" refers to a universal subscriber identity module used in a terminal device. Examples of the SIM include, but not limited to, SIM card, USIM card, ISIM card, or the like. The term "SIM" can be used interchangeably with a USIM or ISIM.

As mentioned above, in case that a multi-USIM terminal device has established a connection in a network A of USIM A and stays in an idle or inactive state in a network B of USIM B, when the terminal device needs to operate in the network B, the terminal device just releases the connection with the network A and switches to the network B without notifying the network A, which will bring a bad impact to performance of the network A. In view of this, Release 17 has approved a mechanism for the terminal device to notify the network A of its switch from the network A.

In a conventional solution, the terminal device transmits a radio resource control (RRC) connection release request message to the network A to notify the network A of its switch from the network A. For example, the terminal device initiates a RRC connection release procedure which is controlled by a RRC timer started when transmitting to the network A a release assistance indication and a value of the RRC timer in a RRC connection release request message, and at expiry of which the terminal device proceeds with local RRC connection release if no response is received from the network A.

However, as the transmission and reception time of the RRC connection release request message is not the same at the terminal device and the network A. For example, when the network A receives the value of the RRC timer, the RRC timer at the terminal device may have already expires, while the network A is not aware of it. This will mislead the network A.

In another conventional solution, in case that a multi-USIM terminal device has established a connection in a network A of USIM A and stays in an idle or inactive state in a network B of USIM B, when the terminal device needs to operate in the network B, the terminal device may maintain the connection with the network A but may also be required to tune to USIM B periodically to listen to paging. Accordingly, a scheduling gap is proposed during which no transmission is performed between the terminal device and the network A.

However, in this case, performance of all traffic between the terminal device and the network A is significantly degraded during the scheduling gap. For example, for a terminal device of 2 Rx/1 Tx, it may work on frequency range (FR) 1 and FR2 at the same time, e.g., by configuring carrier aggregation (CA) or dual connectivity (DC). If a scheduling gap is only supported for all frequency ranges (for convenience, also referred to as per-UE scheduling gap herein), transmission and reception on all the FRs (FR1 and FR2) should be interrupted.

Embodiments of the present disclosure provide improved solutions for communication during a switch among networks of multi-USIM. In one aspect, embodiments of the present disclosure provide a solution for indicating to the network side a point of time before which the switch is expected to be performed. In this way, the network side can know the correct latest switch time that can be accepted by the terminal device.

In another aspect, embodiments of the present disclosure provide a solution for supporting a scheduling gap for a FR (for convenience, also referred to as per-FR scheduling gap herein). In this way, only serving cells of network A that are in the same FR of the camped cell of network B need apply the scheduling gap, and no interruption on the traffic for serving cells of the other FR in network A.

Principles and implementations of the present disclosure will be described in detail below with reference to the figures.

Example of Communication Network

FIG. 1A illustrates a schematic diagram of an example communication network 100A in which embodiments of the present disclosure can be implemented. As shown in FIG. 1A, the communication network 100 may include a network device 110 (also referred to as a first network device 110 hereafter) and a terminal device 120 carrying a first USIM card 121 and a second USIM card 122. The first network device 110 may serve at least one of the first and second USIM cards 121 and 122. The first and second USIM cards 121 and 122 may conform same or different RATs which are existing now or to be developed in the future. It should be noted that the number of the USIM cards carried by the terminal device 120 is not limited to two, and more than two USIM cards also can be applied. For convenience, the following description is given by taking two USIM cards as an example.

As shown in FIG. 1A, the communication network 100A may further include at least one network device 130 (also referred to as a second network device 130 hereafter). Here, only one second network device 130 is shown in FIG. 1 for concise. The network device 130 may also serve at least one of the first and second SIMs 121 and 122. For convenience, unless otherwise stated, the following description is made under the assumption that the first network device 110 serves the first SIM 121 and the second network device 130 serves the second SIM 122. However, it should be noted that, it is merely an example for illustration, and does not make limitation for the present disclosure. For example, the first and second USIMs 121 and 122 may be served by the same network device such as the first network device 110 or the second network device 130.

The first network device 110 may communicate with the terminal device 120 via a channel such as a wireless communication channel. Similarly, the at least one second network device 130 may also communicate with the terminal device 120 via a channel such as a wireless communication channel. For example, the first SIM 121 may communicate with the first network device 110, and the second SIM 122 may communicate with the second network device 130. In another example, the first SIM 121 may communicate with the second network device 130, and the second SIM 122 may communicate with the first network device 110. In still another example, both the first SIM 121 and the second SIM 122 may communicate with the first network device 110. Of course, both the first SIM 121 and the second SIM 122 may also communicate with the second network device 120.

It is to be understood that the number of devices in FIG. 1A is given for the purpose of illustration without suggesting any limitations to the present disclosure. The communication network 100A may include any suitable number of network devices and/or terminal devices adapted for implementing implementations of the present disclosure.

The communications in the communication network 100A may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 1B:
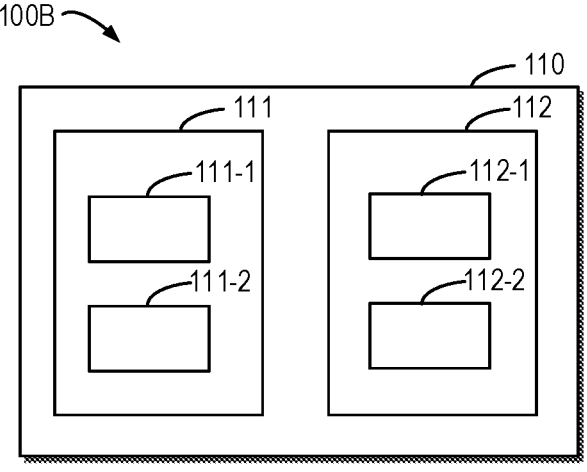
FIG. 1B illustrates a schematic diagram illustrating an example component of a network device in the example communication network.

FIG. 1B illustrates a schematic diagram 100B illustrating an example component of a network device in the example communication network 100A. For illustration, FIG. 1B will be described in connection with the first network devices 110. It is to be understood that the description on FIG. 1B also apply to other network devices in the communication network 100A that shown or not shown. As shown in FIG. 1B, the first network device 110 may comprise a master node (MN) 111 and a secondary node (SN) 112. It is to be understood that the MN 111 and the SN 112 may be implemented as network devices. The MN 111 may have serving cells 111-1 and 111-2, and the SN 112 may have serving cells 112-1 and 112-2. The serving cells of the MN 111 may comprise a primary cell (PCell) and at least one secondary cell (SCell), and the serving cells of the SN 112 may comprise a primary secondary cell (PSCell) and at least one secondary cell (SCell). It is to be understood that each of the MN and SN may have more or less serving cells, and is not limited to that shown.

Return to FIG. 1A, assuming that the terminal device 120 establishes a connection between the SIM 121 and the first network device 110, and stays in an idle state or in an inactive state between the SIM 122 and the second network device 130. When the terminal device 120 is to perform transmission or reception between the SIM 122 and the second network device 130, the terminal device 120 may consider switching to the second network device 130.

In some scenarios, if there is a long-time traffic from the second network device 130 to be processed, such as a voice over long-term evolution (VoLTE)/voice over new radio (VoNR) voice call or the like, the terminal device 120 may perform a long-time switch. In this case, the terminal device 120 may release the connection with the first network device 110 and switch to the second network device 130.

In some other scenarios, if there is a short-time traffic from the second network device 130 to be processed, such as a paging reception, measurements, a tracking area update (TAU), an radio network area update (RNAU), a mobile-originated short message service (MO SMS) or the like, the terminal device 120 may perform a short-time switch. In this case, the terminal device 120 may maintain the connection with the first network device 110 and switch to the second network device 130 temporarily.

Embodiments of the present disclosure provide improved solutions for these scenarios. It should be noted that the above scenarios are merely for illustration, and do not make limitation for the present disclosure. Solutions according to embodiments of the present disclosure can apply to any of these scenarios. This will be described in more detail with reference to FIGS. 2 and 3.

Example Implementation of Releasing Connection

Figure 2:
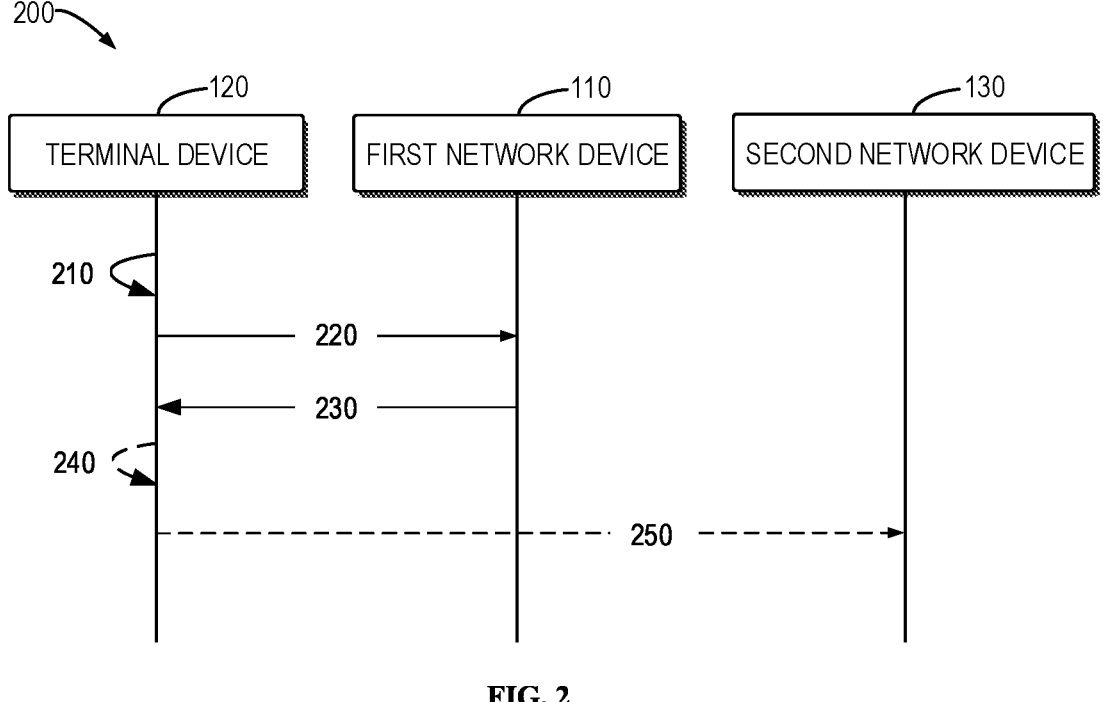
FIG. 2 illustrates a schematic diagram illustrating a process for communication during a switch among networks of multi-USIM according to some embodiments of the present disclosure.

FIG. 2 shows a schematic diagram illustrating a process 200 for communication during a switch among networks of multi-USIM according to embodiments of the present disclosure. For the purpose of discussion, the process 200 will be described with reference to FIG. 1. The process 200 may involve the terminal device 120, the first network device 110 and the second network device 130 as illustrated in FIG. 1. Assuming that the terminal device 120 needs to perform a switch from the first network device 110 to the third network device 130.

As shown in FIG. 2, the terminal device 120 determines 210 information of a point of time regarding the switch. In some embodiments, information of a point of time may comprise a timing point before which the switch is expected to be performed. In other words, the terminal device 120 may determine the latest switch timing point or a deadline for releasing the connection with the first network device 110 that is acceptable to the terminal device 120.

In some embodiments, the information of the point of time may indicate the boundary of at least one of frame, subframe, time slot, or an orthogonal frequency-division multiplexing (OFDM) symbol on the PCell of the first network device 110. In some embodiments, the terminal device 120 may determine at least one of a frame number, a subframe number, a time slot number, or an OFDM symbol number that corresponds to the point of time.

Then the terminal device 120 transmits 220 the information of the point of time to the first network device 110. In some embodiments, the terminal device 120 may transmit the information of the point of time in a message (also referred to as a first message herein) for requesting a release of the connection with the first network device 110. For example, the terminal device 120 may transmit a RRC message such as UEAssistanceInformation to request RRC connection release, and the information of the point of time is comprised in the RRC message. It is to be understood that this is merely an example, and any other suitable forms are also feasible for the first message. In some embodiments, an expected RRC state such as an idle or inactive state is comprised in the first message. Of course, any other suitable information may also be comprised in the first message.

Upon receipt of the first message, the first network device 110 transmits 230 a message (also referred to as a second message herein) for releasing the connection with the first network device 110 to the terminal device 120 before the point of time. For example, the first network device 110 may transmit an RRCRelease message to the terminal device 120.

Accordingly, the terminal device 120 may receive the second message. In some embodiments, the terminal device 120 may determine 240 whether the second message is received before the point of time. If the second message is received before the point of time, the terminal device 120 may release the connection with the first network device 110 and switch 250 to the second network device 130.

In some embodiments, if the second message is received, the terminal device 120 may release the connection with the first network device 110 and switch to the second network device 130. In some embodiments, if the second message is not received before the point of time, the terminal device 120 may autonomously release the connection with the first network device 110 and switch to the second network device 130. Alternatively, if the second message is not received before the point of time, the terminal device 120 may keep the connection with the first network device 110 and wait for the second message.

In some embodiments, the terminal device 120 may transmit a message (also referred to as a third message herein) for cancelling the request for releasing the connection with the first network device 110 before the point of time. For example, the terminal device 120 may transmit, to the first network device 110, another RRC message with an expected RRC state as a connected state. In some embodiments where a RRC timer for the switch is started, the terminal device 120 may also transmit the message for cancelling the release of the connection with the first network device 110 during running of the RRC timer. In this way, the terminal device 120 may indicate reverting of previous release request.

With the process described in connection with FIG. 2, the network side can know the correct latest switch time that can be accepted by the terminal device 120, and thus communication efficiency can be improved.

Example Implementation of Maintaining Connection

Figure 3:
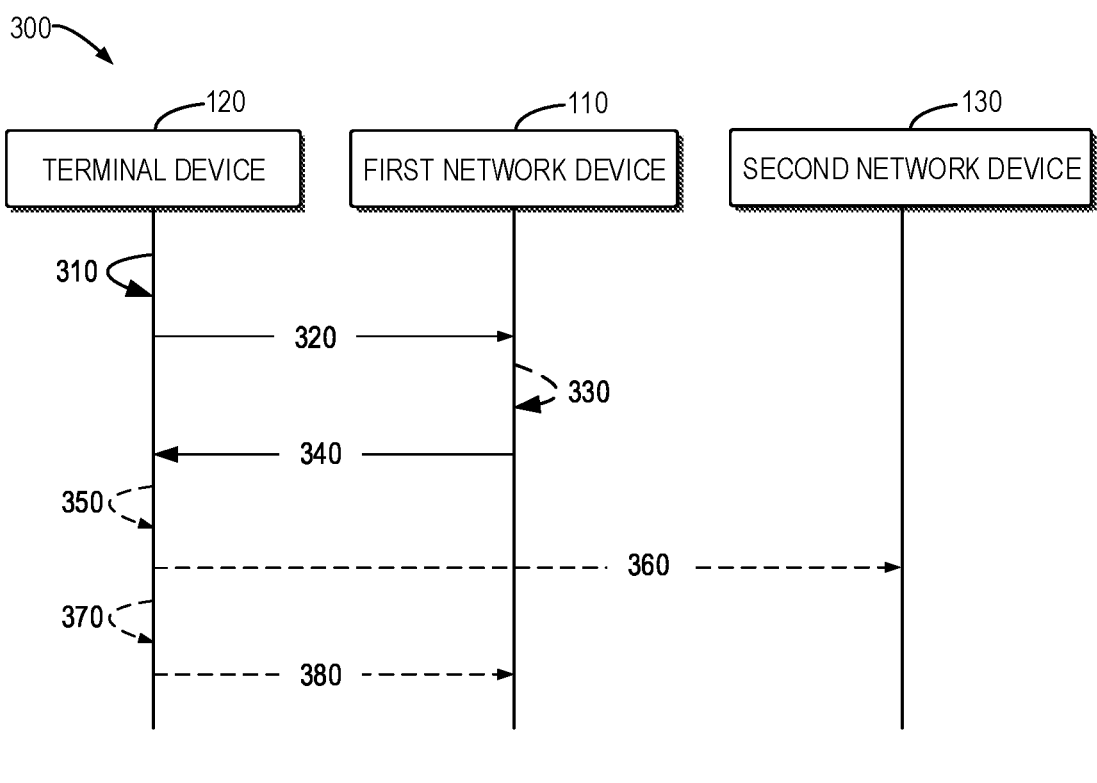
FIG. 3 illustrates a schematic diagram illustrating another process for communication during a switch among networks of multi-USIM according to some embodiments of the present disclosure.

FIG. 3 illustrates a schematic diagram illustrating another process 300 for communication during a switch among networks of multi-USIM according to embodiments of the present disclosure. For the purpose of discussion, the process 300 will be described with reference to FIG. 1. The process 300 may involve the terminal device 120, the first network device 110 and the second network device 130 as illustrated in FIG. 1. Assuming that the terminal device 120 needs to perform a switch from the first network device 110 to the third network device 130.

As shown in FIG. 3, the terminal device 120 may generate 310 information of a scheduling gap (also referred to as information related to an expected scheduling gap herein) of the first network device 110. In some embodiments, during the scheduling gap, no transmission is performed between the terminal device 120 and at least one serving cell of the first network device 110.

In some embodiments, the terminal device 120 may generate information related to multiple expected scheduling gaps. In some embodiments, the multiple expected scheduling gaps may be associated with different services, for example, those services that will be provided by the second network device 130.

In some embodiments, the information related to the expect scheduling gap may comprise at least one of periodicity, a time length, or a time offset for the expected scheduling gap. This may be called as a pattern of the expected scheduling gap.

In some alternative embodiments, the information related to the expect scheduling gap may comprise frequency range information for the expected scheduling gap. In some embodiments, the information related to the expect scheduling gap may comprise a FR of a cell of the second network device 130 to which the terminal device 120 is switched. For example, the cell may be a camped cell. In another example, the cell may be a serving cell. For example, the FR may be FR1 or FR2. In some alternative or additional embodiments, the information related to the expected scheduling gap may comprise a frequency of a cell of the second network device 130 to which the terminal device 120 is switched. Alternatively, the information of the scheduling gap may comprise a FR expected for the scheduling gap. For example, the scheduling gap may be expected to be configured for all the FR. As another example, the scheduling gap may be expected to be configured for FR1. As still another example, the scheduling gap may be expected to be configured for FR2.

In some embodiments, during the scheduling gap, a media access control (MAC) entity of the first network device 110 shall, on the serving cell(s) in the corresponding FR: not perform the transmission of a hybrid automatic repeat request (HARQ) feedback, and channel state information (CSI); not report a sounding reference signal (SRS); transmit on an uplink shared channel (UL-SCH) except for Msg3 or the MSGA payload; if the ra-Response Window or the ra-ContennonResolunonTimer or the msgB-Response Window is running: monitor the physical downlink control channel (PDCCH) as specified; else: not monitor the PDCCH; not receive on an downlink shared channel (DL-SCH).

In some embodiments, the information of the scheduling gap may comprise a point of time at which the scheduling gap expires. In other words, the terminal device 120 expects to return to the first network device 110 at this point of time, i.e., end time of the scheduling gap. In some embodiments, the point of time may be related to at least one of a frame number, a subframe number, a time slot number, or an OFDM symbol number that corresponds to the point of time. In this way, the first network device 110 can know the correct expected returning time of the terminal device 120. In some embodiments, if the terminal device 120 is unable to return after the expiry of the gap, the connection with the first network device 110 may be released.

Upon generation of the information of the scheduling gap, the terminal device 120 transmits 320 the information of the scheduling gap to the first network device 110. In some embodiments, the terminal device 120 may transmit the information of the scheduling gap in a message (also referred to as a fourth message herein) for requesting a switch from the first network device 110 to the second network device 130 without releasing a RRC connection with the first network device 110.

Upon receipt of the fourth message, the first network device 110 may generate 330 a configuration of the scheduling gap based on the information of the scheduling gap comprised in the fourth message. According to embodiments of the present disclosure, the configuration comprises at least one FR to which the scheduling gap is applied. In some embodiments of per-UE configuration, the configuration may comprise all the FR, e.g., both FR1 and FR2. In some embodiments of per-FR configuration, the configuration may comprise FR1 or FR2. In some embodiments, the first network device 110 may configure multiple scheduling gaps associated with different services. In this case, the first network device 110 can indicate that each scheduling gap is applied to all frequency ranges (i.e., per UE scheduling gap) or is applied to FR1/FR2 of the first network device 110 (i.e., per FR scheduling gap).

In some embodiments, the configuration of per UE/FR1/FR2 scheduling gap may be based on the FR of the second network device 130. For example, if a serving cell in the second network device 130 to which the terminal device 120 is switched operates in FR2, the first network device 110 may configure per FR2 scheduling gap to the terminal device 120.

Upon generation of the configuration of the scheduling gap, the first network device 110 transmits 340 the configuration to the terminal device 120.

In some embodiments where the first network device 110 comprises a MN (for example, MN 111) and a SN (for example SN 112), the first network device 110 may receive the information of the scheduling gap by the MN 111, and generate the configuration by the MN 111 based on the information of the scheduling gap. Then the MN 111 transmits the configuration to the terminal device 120. The MN 111 transmits the configuration to the SN 112.

In some alternative or additional embodiments, the first network device 110 may receive the information of the scheduling gap by the MN 111 and transmit the information of the scheduling gap from the MN 111 to the SN 112, so that the SN 112 generates the configuration based on the information of the scheduling gap. In some embodiments, the SN 112 may transmit the configuration to the terminal device 120. Alternatively, the SN 112 may transmit the configuration to the MN 111 so that the MN 111 transmits the configuration to terminal device 120.

For example, in case of NE-DC, the MN 111 may generate the configuration of the scheduling gap (including per UE/FR1/FR2 configuration), and transmit it to the terminal device 120. The MN 111 may inform the configuration of the scheduling gap (including per UE/FR1 configuration) to the SN 112 by Xn message.

As another example, in case of NR-DC, the MN 111 may generate the configuration of the scheduling gap (including per UE/FR1/FR2 configuration), and transmit it to the terminal device 120. The MN 111 may inform the configuration of the scheduling gap (including per UE/FR1/FR2 configuration) to the SN 112 by Xn message.

As a still another example, in case of (NG) EN-DC, the MN 111 may generate per FR1/UE configuration of the scheduling gap, and transmit it to the terminal device 120. Further, the MN 111 may transmit the information related to the expected scheduling gap to the SN 112. The SN 112 generates per FR2 configuration of the scheduling gap, and transmits it to the terminal device 120. In some embodiments, the MN 111 may transmit, to the SN 112, the information of the scheduling gap associated with FR2 from the terminal device 120. The SN 112 may generate the scheduling gap associated with FR2 based on the information and configure it to the terminal device 120 by signaling radio bearer 3 (SRB3). Alternatively, the SN 112 may transmit the scheduling gap associated with FR2 to the MN 111 so that the MN 111 configures it to the terminal device 120 by SRB1.

Upon receipt of the configuration of the scheduling gap from the first network device 110, the terminal device 120 may determine 350, from the configuration of the scheduling gap, at least one FR to which the scheduling gap is applied, and switch 360 to the second network device 130 on the at least one FR of the first network device 110. That is, the terminal device can switch to the second network device 130 on at least one serving cell of the first network device 110 that corresponds to the FR. In this way, the terminal device 120 does not perform any transmission or reception only on the serving cells of corresponding FR in the first network device 110, and transmission on other serving cells of the first network device 110 is not interrupted.

In some scenarios, the terminal device 120 may switch 370 back to the first network device 110 earlier before the ends of the switch. In this case, the terminal device 120 may transmit 380 a notification to the first network device 110. In some embodiments, the notification may indicate that the terminal device 120 early returns to the first network device 110. In this way, radio resource wasting and service interruption can be avoided.

In some embodiments, the terminal device 120 may transmit a scheduling request (SR) to the first network device 110. The SR indicates that the terminal device 120 early returns to the first network device 110. In some embodiments, the terminal device 120 may transmit the SR via a dedicated resource configured for the SR. In this way, early return to the first network device 110 can be indicated to the first network device 110. In some embodiments, the dedicated resource may be configured together with the scheduling gap. Of course, the dedicated resource may also be configured by any other suitable ways.

In some alternative embodiments, the terminal device 120 may generate a media access control control element (MAC CE) to the first network device 110. In some embodiments, the MAC CE may indicate that the terminal device 120 early returns to the first network device 110. In some embodiments, the MAC CE is identified by a MAC subheader with a logic channel identifier (LCID) and the MAC CE may has a fixed size of zero bits. In this way, an early return of the terminal device 120 to the first network device 110 can be notified to the first network device 110.

Upon generation of the MAC CE, the terminal device 120 may determine if there is an uplink grant. If there is the uplink grant, the terminal device 120 may transmit the MAC CE to the first network device 110 based on the uplink grant. If there is no uplink grant, the terminal device 120 may transmit a SR to the first network device 110. The first network device 110 may configure a grant to the terminal device 120 in response to the SR, and the terminal device 120 may transmit the MAC CE based on the configured grant. In this way, early return to the first network device 110 can also be indicated to the first network device 110.

In some alternative embodiments, the terminal device 120 may initiate an random access procedure to the first network device 110. For example, the terminal device 120 may initiate the random access procedure based on 2-step random access channel (RACH). In another example, the terminal device 120 may initiate the random access procedure based on 4-step RACH. In this way, early return to the first network device 110 can also be indicated to the first network device 110.

In some embodiments where multiple scheduling gaps are configured and each of the multiple scheduling gaps is associated with a corresponding identity (ID), the terminal device 120 may transmit an indication indicating a cancel of one or more of the multiple scheduling gaps. In some embodiments, the indication may comprise IDs of the one or more scheduling gaps.

It should be noted that actions shown in FIGS. 2 and 3 are not always necessary for implementing embodiments of the present disclosure, and more or less actions may be adapted as needed. Corresponding to the processes described in FIGS. 2 and 3, embodiments of the present disclosure provide methods of communication implemented at a terminal device and at a network device. These methods will be described below with reference to FIGS. 4 to 7.

Example Implementation of Methods

FIG. 4 illustrates an example method 400 of communication implemented at a terminal device in accordance with some embodiments of the present disclosure. For example, the method 400 may be performed at the terminal device 120 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

As shown in FIG. 4, at block 410, the terminal device 120 determines information of a point of time regarding a switch of the terminal device 120 from the first network device 110 to the second network device 130. In some embodiments, the first network device 110 is associated with a first SIM of the terminal device 120 and the second network device 130 is associated with a second SIM of the terminal device 120. In some embodiments, the information of the point of time may comprise at least one of a frame number, a subframe number, a time slot number, or an OFDM symbol number that corresponds to the point of time.

At block 420, the terminal device 120 transmits the information of the point of time to the first network device 110 for requesting a release of a connection with the first network device 110. In some embodiments, the terminal device 120 may transmit the information of the point of time to the first network device 110 in a message for requesting a release of a connection with the first network device 110. In some embodiments, the terminal device 120 may receive a message for releasing the connection with the first network device 110. In response to receiving the message for releasing the connection with the first network device 110, the terminal device 120 may release the connection with the first network device 110 and switch to the second network device 130.

In some embodiments, if the second message is not received from the first network device 110 before the point of time, the terminal device 120 may release the connection with the first network device 110. In some alternative embodiments, if the second message is not received from the first network device 110 before the point of time, the terminal device 120 may keep the connection with the first network device 110 and wait for the receipt of the message for releasing the connection with the first network device 110.

In some embodiments, the terminal device 120 may transmit before the point of time, to the first network device 110, a message for cancelling the request for releasing the connection with the first network device 110.

FIG. 5 illustrates another example method 500 of communication implemented at a terminal device in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

As shown in FIG. 5, at block 510, the terminal device 120 may generate information of a scheduling gap of the first network device 110. In some embodiments, the first network device 110 is associated with a first SIM of the terminal device 120 and the second network device 130 is associated with a second SIM of the terminal device 120.

In some embodiments, the information of the scheduling gap may comprise at least one of the following: at least one of periodicity, a time length, or a time offset for the scheduling gap, FR information for the scheduling gap, or a point of time at which the scheduling gap expires.

In some embodiments, the FR information may comprise at least one of the following: at least one of a FR or a frequency of a cell of the second network device 130 to which the terminal device 120 is switched, or a FR expected for the scheduling gap.

In some embodiments, the point of time may be related to at least one of a frame number, a subframe number, a time slot number, or an OFDM symbol number that corresponds to the point of time.

At block 520, the terminal device 120 transmits the information of the scheduling gap to the first network device 110 for requesting a switch from the first network device to a second network device without releasing an RRC connection with the first network device. In some embodiments, the terminal device 120 may transmit the information of the scheduling gap in a message for requesting the switch from the first network device 110 to the second network device 130 without releasing the RRC connection with the first network device 110.

In some embodiments, the terminal device 120 may receive a configuration of the scheduling gap from the first network device 110, the configuration comprising a FR to which the scheduling gap is applied, and switch to the second network device 130 on at least one serving cell of the first network device 110 that corresponds to the FR based on the configuration of the scheduling gap.

In some embodiments, if the terminal device 120 does not switch from the second network device 130 to the first network device 110, the terminal device 120 may release the connection with the first network device 110. For example, the terminal device 120 may determine whether the terminal device 120 switches from the second network device 130 to the first network device 110 upon expiry of the scheduling gap. If the terminal device 120 does not switch from the second network device 130 to the first network device 110 upon expiry of the scheduling gap, the terminal device 120 may release the connection with the first network device 110.

In some embodiments, the terminal device 120 may transmit the information of the scheduling gap to a MN of the first network device 110. In some embodiments, the terminal device 120 may receive the configuration from a SN of the first network device 110, the configuration being generated by the SN. In some embodiments, the terminal device 120 may receive the configuration from the MN, the configuration being generated by the SN or the MN.

In some embodiments, in response to switching from the second network device 130 to the first network device 110 before the scheduling gap expires, the terminal device 120 may transmit, to the first network device 110, a notification indicating that the terminal device 120 early returns to the first network device 110.

In some embodiments, the terminal device 120 may transmit a SR to the first network device 110, the SR indicating that the terminal device early returns to the first network device. In some embodiments, the SR may be transmitted via a dedicated resource. In some embodiments, the terminal device 120 may initiate an random access procedure to the first network device 110.

In some embodiments, the terminal device 120 may generate a MAC CE indicating that the terminal device 120 early returns to the first network device 110. If there is an uplink grant, the terminal device 120 may transmit the MAC CE to the first network device 110 based on the uplink grant. If there is no uplink grant, the terminal device 120 may transmit a SR to the first network device 110. In some embodiments, the MAC CE is identified by a MAC subheader with a LCID and the MAC CE.

In some embodiments, multiple scheduling gaps associated with different services may be configured to the terminal device 120. In some embodiments, the terminal device 120 may transmit, to the first network device 110, an indication indicating a cancel of one or more of the multiple scheduling gaps.

FIG. 6 illustrates an example method 600 of communication implemented at a network device in accordance with some embodiments of the present disclosure. For example, the method 600 may be performed at the first network device 110 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

As shown in FIG. 6, at block 610, the first network device 110 receives, from the terminal device 120, information of a time of point for requesting a release of a connection with the first network device 110, the information of the point of time regarding a switch from the first network device 110 to a second network device 130. In some embodiments, the first network device 110 is associated with a first SIM of the terminal device 120 and the second network device 130 is associated with a second SIM of the terminal device 120.

In some embodiments, the information of the point of time may comprise at least one of a frame number, a subframe number, a time slot number, or an OFDM symbol number that corresponds to the point of time.

At block 620, the first network device 110 transmits, to the terminal device 120, a message for releasing the connection with the first network device 110. In some embodiments, the first network device 110 may receive before the point of time, from the terminal device 120, a message for cancelling the release of the connection with the first network device 110.

FIG. 7 illustrates another example method 700 of communication implemented at a network device in accordance with some embodiments of the present disclosure. For example, the method 700 may be performed at the first network device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the network device 110 may receive, from the terminal device 120, information of a scheduling gap of the first network device 110 for requesting a switch from the first network device 110 to the second network device 130 without releasing a connection with the first network device 110. In some embodiments, the first network device 110 is associated with a first SIM of the terminal device 120 and the second network device 130 is associated with a second SIM of the terminal device 120.

In some embodiments, the information may comprise at least one of the following: at least one of periodicity, a time length, or a time offset for the scheduling gap; FR information for the scheduling gap; or a point of time at which the scheduling gap expires.

In some embodiments, the frequency range information may comprise at least one of the following: at least one of a FR or a frequency of a serving cell of the second network device 130 to which the terminal device 120 is switched; or a FR expected for the scheduling gap.

In some embodiments, the point of time may be related to at least one of a frame number, a subframe number, a time slot number, or an OFDM symbol number that corresponds to the point of time.

At block 720, the first network device 110 transmits, to the terminal device 120, a configuration of the scheduling gap based on the information of the scheduling gap. In some embodiments, the first network device 110 may generate the configuration, the configuration comprising at least one FR to which the scheduling gap is applied.

In some embodiments, a master node of the first network device 110 may receive the information of the scheduling gap, generate the configuration based on the information, and transmit the configuration to the terminal device 120. In some embodiments, a master node of the first network device 110 may receive the information of the scheduling gap, and transmit the information of the scheduling gap to a SN of the first network device 110. In these embodiments, the SN may generate the configuration by the SN, and transmit the configuration to the terminal device 120.

In some embodiments, the first network device 110 may receive a notification indicating that the terminal device 120 switched from the second network device 130 to the first network device 110 before the scheduling gap expires.

In some embodiments, the first network device 110 may receive a SR from the terminal device 120. The scheduling request indicates that the terminal device 120 early returns to the first network device 110. In some alternative embodiments, the first network device 110 may detect an random access procedure initiated by the terminal device 120. In this way, the first network device 110 can receive the notification about the early return of the terminal device 120 to the first network device 110.

In some alternative embodiments, the first network device 110 may receive the notification by receiving a MAC CE from the terminal device 120. The MAC CE indicates that the terminal device 120 early returns to the first network device 110. In some embodiments, the MAC CE may be identified by a MAC subheader with a LCID and the MAC CE may have a fixed size of zero bits.

In some alternative embodiments, the first network device 110 may receive the notification by receiving a SR from the terminal device 120, transmitting an uplink grant in response to receiving the SR; and receiving the MAC CE from the terminal device 120 via the uplink grant.

In some embodiments, multiple scheduling gaps associated with different services may be configured to the terminal device 120. In some embodiments, the first network device 110 may receive, from the terminal device 120, an indication indicating a cancel of one or more of the multiple scheduling gaps, and cancel the one or more of the multiple scheduling gaps based on the indication.

The operations of steps in methods 400-700 are similar with that described in connection with FIGS. 2 and 3, and thus other details are not repeated here.

Example Implementation of Device

Figure 8:
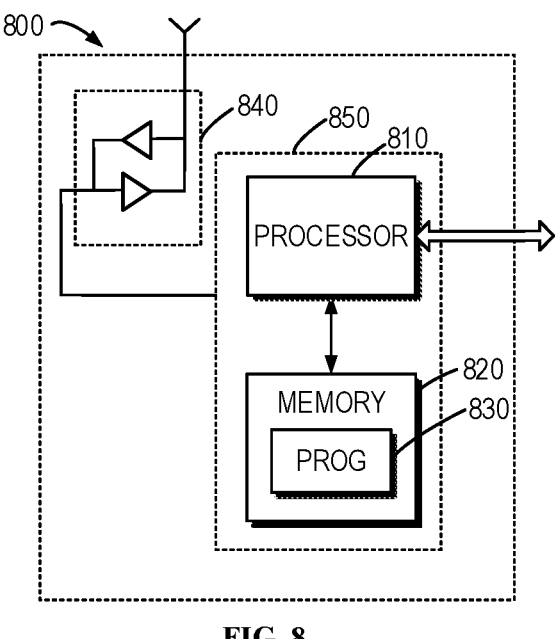
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the first network device 110, the terminal device 120, or the second network device 130 as shown in FIG. 1. Accordingly, the device 800 can be implemented at or as at least a part of the first network device 110, the terminal device 120, or the second network device 130.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a multi-universal subscriber identity module (MUSIM) terminal device, the method comprising:

transmitting gap preference information for first gaps for MUSIM in the MUSIM terminal device to a first network device; and receiving configuration information for second gaps for the MUSIM from the first network device, each of the second gaps for the MUSIM having a gap identity (ID).

2. A method performed by a master node (MN), the method comprising:

receiving a gap preference information for first gaps for multi-universal subscriber identity module (MUSIM) in a MUSIM terminal device, from the MUSIM terminal device; and transmitting configuration information for second gaps for the MUSIM to the MUSIM terminal device, each of the second gaps for the MUSIM having a gap identity (ID).

3. The method of claim 2, further comprising transmitting the configuration information for the second gaps for the MUSIM to a secondary node (SN).

4. A multi-universal subscriber identity module (MUSIM) terminal device comprising a processor configured to cause the terminal device to:

transmit gap preference information for first gaps for MUSIM in the MUSIM terminal device to a first network device; and receive configuration information for second gaps for the MUSIM from the first network device, each of the second gaps for the MUSIM having a gap identity (ID).

* * * * *